Nov. 29, 1927.
J. V. ROWAN
1,650,742
SHOCK ABSORBER
Filed Aug. 20, 1924
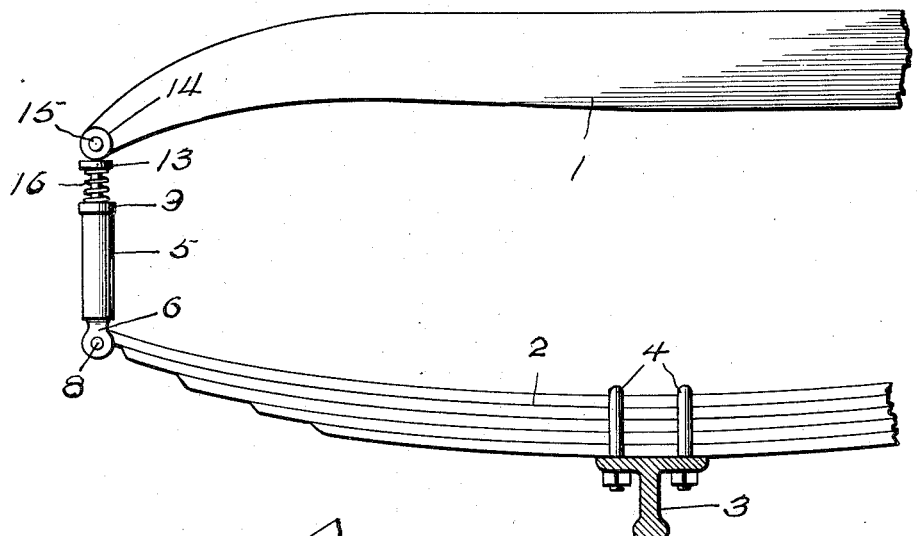
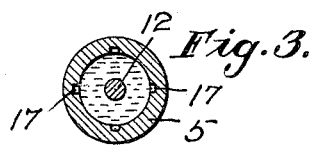
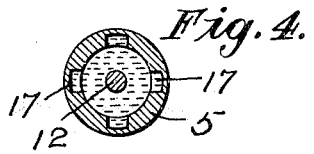
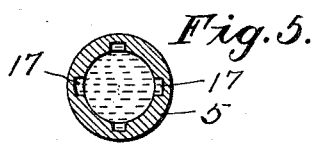
Inventor
John V. Rowan,
By
Attorney Patented Nov. 29, 1927.

1,650,742

UNITED STATES PATENT OFFICE.

JOHN V. ROWAN, OF THE UNITED STATES ARMY, AURORA HEIGHTS, VIRGINIA.

SHOCK ABSORBER.

Application filed August 20, 1924. Serial No. 733,149.

This invention relates to a fluid cushioning device and more particularly to a shock absorber, applicable in many ways to take up the shock and rebound of, for instance, spring supports of vehicle bodies, the recoil in ordnance construction, or the like.

An object of this invention being to provide simple, durable, and inexpensive means for diminishing the shock of compression as well as rebound of the spring suspension of a spring supported load, such as made with any automobile body suspension.

A further object being to provide a device adapted to be applied to motor vehicles or the like for the use in combination with the spring suspension thereof, for absorbing and equalizing the shock incident to the travel of the vehicle from rough road surfaces.

A further object being to provide for a gradual increased resistance control by which both recoil and counter recoil of large calibre and rapid fire guns may be controlled and "jump" of the piece largely eliminated, together with cushioning the shock normally sustained by the carriage and insuring practically instantaneous restoration to the normal firing position without disarranging shock.

A further object being to provide an oil cushioning device adapted for use in railroad yards or terminals to control the bump of the train at the end of the tracks and thereby do away with the cumbersome expensive space occupying piling or heavy girders otherwise employed.

A further object being to provide means whereby the shock of road travel is equalized and also for use in connection with the bumper of an automobile, truck, railway vehicles or the like, to absorb the shock of violent collision by causing the momentum of the vehicle to be absorbed or taken up through the oil grooves provided.

These and other objects will readily appear to those skilled in the art in the device described in the specification and illustrated in the drawings accompanying same and forming a part of this application.

For the purpose of illustration the device is shown applied to a fragment of a vehicle suspension, in which similar numerals indicate corresponding parts in all the figures.

Fig. 1 is a side view of a part of the frame and spring of a vehicle, with my improved shock absorber applied thereto.

Fig. 2 is an enlarged vertical section of the shock absorber.

Figs. 3, 4, and 5 are horizontal sections on lines 3—3, 4—4, and 5—5 of Fig. 2 respectively.

Reference now being had to the drawings by numerals, 1 indicates a portion of the frame of a vehicle, 2 the spring, 3 the supporting axle, and 4 the clamps for securing the spring to the axle. All of the above parts may be of any construction and form no part of this invention.

The improved shock absorber consists of the tubular member 5, having perforated ears 6 extending from its lower end, ears 6 resting on opposite sides of eye 7 at the end of spring 2, where said parts are secured together by bolt 8 passing through the perforations in ears 6 and eye 7 of spring 2.

The upper end of tubular member 5 is closed by cap 9, threaded thereon, which is provided with a central opening 10.

Mounted for oscillation within the tubular member 5 is piston 11 having a stem 12 extending through opening 10 in the cap 9 of said member. The upper end of stem 12, is provided with a flange 13 from which perforated extension 14 projects, through which bolt 15 passes to mount the upper end of the stem to the vehicle frame 1.

Surrounding stem 12 between flange 13 and cap 9 of the tubular member is a spiral compression spring 16, of sufficient strength as to support the normal load of the vehicle, and in said supported position the piston 11 within the tubular member will rest slightly above the center of said member as shown in Fig. 2.

The tubular member 5 is filled to a point above the normal position of piston 11, preferably with a non-freezing liquid of any preferred density or other fluid if desired.

The interior wall of said tubular member 5 is provided with a plurality of tapering grooves 17, said grooves having their greatest cross sectional area, located adjacent to the normal position of piston 11, and taper in either direction from that point.

Grooves 17, as will be seen in Figs. 2, 3, 4 and 5, diminish or taper in depth as well as in width, below said point of normal position of the piston 11 somewhat more gradually than they do above said point. The grooves above the normal position of the piston being shorter and slightly more rapidly reduced in cross sectional area than they are below.

It will be seen in Fig. 2 that the grooves 17 not only diminish in depth but are arranged in circuitous or serpentine form, said irregular arrangement of the grooves offering a modified baffle for the passage of the fluid.

The operation is obvious and is as follows: The weight of the vehicle is normally supported on spring 16 which rests on top of casing 5, the latter being mounted at its lower end on spring 2. As thus far described there is added to the usual spring 2 an additional spring or cushioning element 16. With the parts in their normal position the weight being supported undisturbed, the piston 11 rests as shown slightly above the center of the tubular member 5, at the point of greatest cross sectional area of grooves 17, with the level of fluid preferably resting somewhat above the level of the piston and filling the tubular member approximately three-quarters full.

When anything causes the axle 3 suddenly to rise, spring 2 bends upwardly at its center and immediately places an abnormal upward pressure on its outer end secured to the lower end of tubular member 5. The sudden upward thrust on the member 5, causes spring 16 to be compressed and piston 11 to be forced downwardly in the tubular member, said movement of the piston within the tubular member being controlled by the passage of the fluid from below, to above the piston through grooves 17.

The action of spring 16 and movement of the fluid as above described, absorb to a large degree, the sudden abnormal upward pressure at the lower end of tubular member 5 which is brought about in a gradual manner, owing to the taper or gradual reduction in the groove which gradually diminishes the flow of fluid past the piston and permits it to move slowly.

Said absorption of pressure, tends to diminish the rebound in the spring tube which would otherwise tend to toss the weight upwardly as is the result in the ordinary spring suspension.

Any rebound that is not absorbed in the collapsing or compression movement, is further diminished by the movement of the piston 11 in an opposite direction within the tubular member, which follows the compression movement and gradually and increasingly delays the movement of the parts referred to.

Having thus described my invention, what I claim as new and desire to secure by Letters Patent is:

1. A shock absorber comprising a tubular member pivotally mounted at its lower end on a spring support, continuous grooves tapered in depth and width, in opposite directions toward their ends, arranged in the wall of the tubular member, a piston within the tubular member, a stem extending from the piston through the upper end of the tubular member and connected with the load, and a coil spring of sufficient strength to support the load, arranged between the load and the upper end of the tubular member and adapted to maintain the piston normally at the point of greatest cross sectional area of said grooves and fluid within the tubular member at a height greater than the normal position.

2. A combined shock absorber and load support, comprising a tubular member adapted to contain a fluid, pivotally mounted on its lower end on a spring support, oppositely tapering grooves in the inner wall of the cylinder, a piston mounted within the tubular member, a stem extending from the piston through the upper end of the tubular member connected with the load, and a spring of sufficient strength to support the load, arranged between the load and the tubular member and adapted to normally hold the piston at the point of greatest cross sectional area of the grooves in the tubular member.

JOHN V. ROWAN.